Feb. 6, 1934.     A. OSWALD     1,945,977
COLOR PHOTOGRAPHY OBJECTIVE
Original Filed March 23, 1925
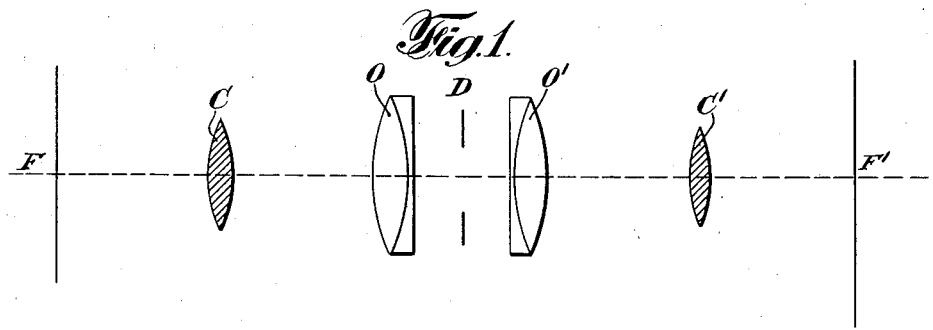
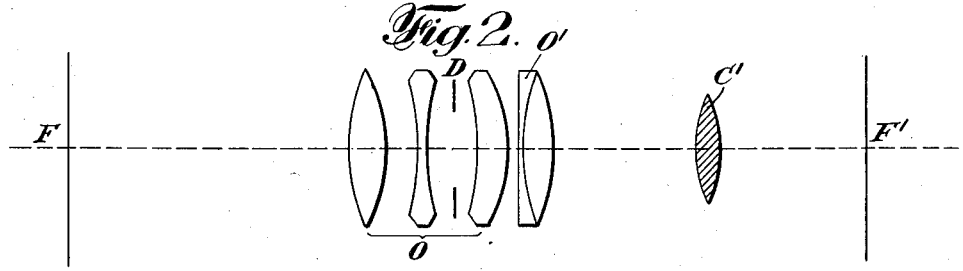
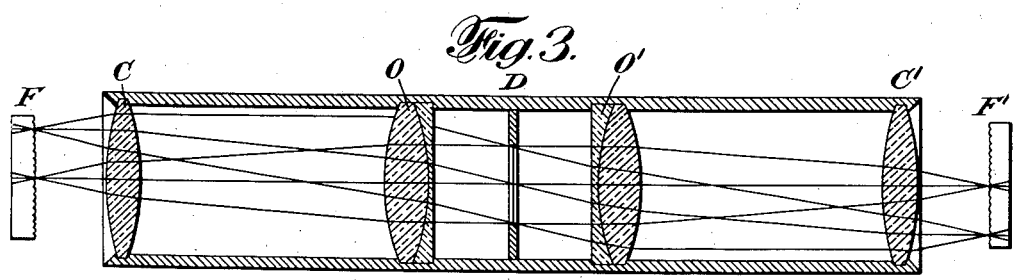
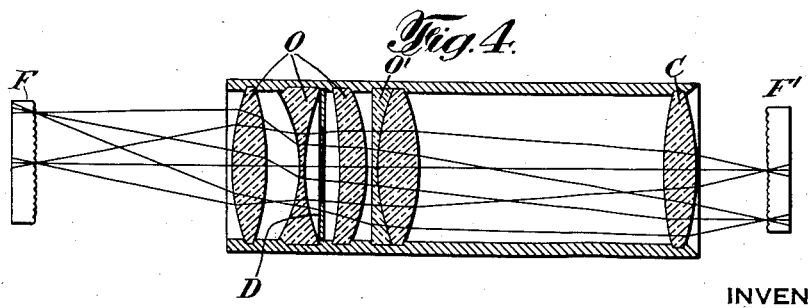
INVENTOR
André Oswald
BY his ATTORNEY
Arthur Wright Patented Feb. 6, 1934

1,945,977

UNITED STATES PATENT OFFICE 1,945,977

COLOR PHOTOGRAPHY OBJECTIVE

André Oswald, Paris, France, assignor to Keller-Dorian Colorfilm Corporation, New York, N. Y., a corporation of Delaware Original application March 23, 1925, Serial No. 17,724, and in France February 7, 1925. Divided and this application February 2, 1931. Serial No. 512,817

11 Claims. (Cl. 88—24)

The processes for color photography based on the use of sensitized films goffered on their unsensitized side with a lenticular, spherical or cylindrical system, offer as to practical application multifarious difficulties. These difficulties arise from the fact that the various cells of the film work under different optical conditions according to whether they are positioned on the axis of the lens or at the edge of the field.

Endeavors have already been made to overcome the said difficulties by, for picture-taking etc., arranging very close to the film to be exposed, a collimating lens having simply a focus in the vicinity of the focus of the objective. Such a device, as characterized solely by the above arrangement, does not invariably correct the above drawbacks, since, in fact, in order to obtain a proper and unfailing correction the lens must form with the objective an optical set perfectly defined.

My invention relates to a novel optical combination constituting an objective for color picture copying through the use of which all the above enumerated disadvantages are eliminated.

This is a divisional application of my co-pending application entitled Objective for color photography, Serial No. 17,724, filed March 23, 1925.

While my invention is capable of being carried out in many different ways, by way of illustration I have shown only certain embodiments of my invention in the accompanying drawing, in which—

Fig. 1 is a diagrammatic representation of a symmetrical objective utilizing my invention in copying;

Fig. 2 is a diagrammatic unsymmetrical objective for use in copying;

Fig. 3 is a vertical section of the apparatus shown in Fig. 1; and

Fig. 4 is a similar view of an apparatus such as shown in Fig. 2.

In the figures the same reference letters denote the same parts.

In order to review in detail the characteristic conditions that have to be fulfilled by the optical combinations which are the object of my invention and in order to render their importance clearly apparent, it is first of all necessary to set forth the inconveniences attaching to the device at present in use.

Under good picture-taking conditions each lenticular element projects on the sensitized surface an extremely reduced image of a selecting filter.

It is, first of all, of the utmost necessity, in order to preserve the purity of the colors, that the images be quite sharp, so that the partitioning lines which will be photographed may define as boldly as possible the various colored regions.

Now, then, while this condition is well nigh fulfilled as regards the lenticular elements situated in the vicinity of the axis of the objective used, such is not the case as regards the marginal lenticular elements which give considerably off-centered images of the filter.

The resulting lack of sharpness of the marginal or secondary images of the filter is not compensated for, either during the subsequent operations of positive printing or during projection. On the contrary, each optical repetition of the images increases this lack of sharpness so that the defect ultimately becomes four times as great on projection. This partly accounts for the lack of purity of marginal colors which affects projections made by this process.

Still other serious inconveniences also arise from the difference in optical working of the marginal and of the central lenticular elements, to wit:

In order that the reconstitution of projected colors may be exact, all the regions on the film carrying the picture must reciprocally be represented in their turn, on projection, by images accurately superimposed in a single mass. This implies that the pupil of incidence of the projecting objective must be the same distance from the film as the pupil of emergence of the picture-taking objective. Practically speaking, projecting objectives must be used the focal length of which is about the same as the one of the picture-taking objective. This requirement is generally inconsistent with the distance at which the projection screens stand in halls and with the size of such screens.

Another difficulty arising from the same cause is the necessity for perfect centering of the photographic negative or cliché on the axis of the projecting objective. A displacement of the center of the cliché in its plane respecting the optical axis displaces to the same extent the chromogene images respecting the selector film of projection and involves a diffusion of colors.

In the case of contact printing the images of the filter on the original film are reproduced correctly as concerns the central elements and incorrectly as concerns the marginal elements.

In copying by means of a camera obscura and unit enlargements, the diaphragm must occupy the same position as to distance and have the same angular extent, respecting the two films, as in picture-taking, a requirement which leads to the use of objectives working for the same field with a considerable aperture ratio, twice that of picture-taking objectives; whence imperfect copies are produced.

My invention relates to a novel optical combination for providing objectives for copying by means of which all the above enumerated disadvantages are eliminated.

In principle it provides an optical system in such a manner that the pupil of emergence of the combination (where the final image of the diaphragm is located) is removed at infinitum or at any rate very far, in front of the film so that all the difficulties appertaining to the position of the diaphragm as to distance will be done away with and there will remain only angular questions to be considered, the solution of which as to geometrical optics then becomes quite easy.

Forms of objectives meeting this requirement can already be obtained by starting with present forms and by placing in the vicinity of their focal plane a lens C which will play the part of a collimator and the focal length of which is so arranged that the pupil of emergence of the original objective will be in the anterior focal plane of lens C. This is indicated on the figure of the drawing wherein the pupil of emergence of the objective O comprising the concavo-convex lens, diaphragm, bi-concave lens and bi-convex lens is indicated to the left of the concavo-convex lens and wherein the said pupil of emergence coincides with the anterior focal plane or principal focus of the collimator lens C. The pupil of emergence of the objective O is the place where the image of the said diaphragm seems to the eye to be located, when the eye is positioned at the principal focus of the objective O to the right thereof, when looking at said diaphragm through said objective O. The preferred shape of this lens is determined by the requirement of reducing to a minimum the distortion introduced thereby into the image.

The aberrations introduced by it, spherical aberration, aigrettes, astigmatism and curvature of the field are compensated by the de plano introduction of residual aberrations into the original objective.

For instance, the collimating lens introduces a forward curvature of the image substantially equal to $\sigma/\eta$; $\sigma$ denoting its power and $\eta$ the index of refraction of the material it is made of.

The original objective must, therefore, be so calculated as to offer a curvature in a backward direction equal to $\sigma\eta$. It must also offer a slight supercorrection of the spherical aberration and of the chromatic aberration.

As examples of embodiments of my invention I will indicate the following forms of objectives:

For copying purposes:

(a) Symmetrical objectives (Figs. 1 and 3), each of the halves of which is constituted by two separate optical systems O and C, O' and C'; systems O and O' playing the part of an objective proper, systems C and C' the part of collimating lenses for the diaphragm located at D, at a suitable mid-distance between the systems O and O'.

(b) Unsymmetrical objectives (Figs. 2 and 4) permitting, on copying, a non-collimated film to be transformed into a collimated film. I obtain such objectives by combining an ordinary picture-taking objective O (the same as has served for the first filming) with the rear half O' C' of the previously described copying objective so that the diaphragm D of this second part will coincide as to position with the pupil of entrance of the objective used for picture-taking.

I can also reach the sought for result by moving away the collimating lens considerably forward of the focal plane. This will then be able to contribute advantageously in converging the system. This is particularly useful in the case of wide aperture systems as those required to copy films with a camera obscura.

While I have described my invention above in detail I wish it to be understood that many changes may be made therein without departing from the spirit of the same.

I claim:

1. An optical combination comprising an objective adapted for copying films in cinematography with films having a goffered base containing a lens system made up of a plurality of different elements having a collimating lens and constructed so as to reproduce on a copy film a separate registration of each of the monochrome registrations representing different colors carried by an original film and a diaphragm unaccompanied with color areas, so arranged that the pupil of emergence of said objective is in the anterior focal plane of the collimator lens.

2. An optical combination comprising an objective adapted for copying films in cinematography with films having a goffered base containing a lens system made up of a plurality of different elements having a collimating lens and constructed so as to reproduce on a copy film a separate registration of each of the monochrome registrations representing different colors carried by an original film and a diaphragm unaccompanied with color areas so arranged that the pupil of emergence of said objective is in the anterior focal plane of the collimator lens, the latter being in the vicinity of the focal plane of said objective.

3. An optical combination comprising an objective adapted for copying films in cinematography with films having a goffered base containing a lens system made up of a plurality of different elements having a collimating lens and constructed so as to reproduce on a copy film a separate registration of each of the monochrome registrations representing different colors carried by an original film and a diaphragm unaccompanied with color areas, so arranged that the pupil of emergence of said objective is in the anterior focal plane of the collimator lens, the aberrations introduced by the collimator lens being corrected by compensating aberrations introduced into said objective.

4. An optical combination comprising an objective adapted for copying films in cinematography with films having a goffered base containing a lens system made up of a plurality of different elements having a collimating lens and constructed so as to reproduce on a copy film a separate registration of each of the monochrome registrations representing different colors carried by an original film and a diaphragm unaccompanied with color areas, so arranged that the pupil of emergence of said objective is in the anterior focal plane of the collimator lens, the latter being in the vicinity of the focal plane of said objective, the aberrations introduced by the collimator lens being corrected by compensating aberrations introduced into said objective.

5. An optical combination comprising an objective adapted for copying films in cinematography with films having a goffered base containing a lens system made up of a plurality of different elements having a collimating lens and constructed so as to reproduce on a copy film a separate registration of each of the monochrome registrations representing different colors carried by an original film and a diaphragm unaccompanied with color areas, so arranged that the pupil of emergence of said objective is in the anterior focal plane of the collimator lens, the aberrations comprising spherical aberration, aigrettes, astigmatism and curvature of the field, introduced by the collimator lens being corrected by compensating aberrations introduced into said objective.

6. An optical combination comprising an objective adapted for copying films in cinematography with films having a goffered base containing a lens system made up of a plurality of different elements having a collimating lens and constructed so as to reproduce on a copy film a separate registration of each of the monochrome registrations representing different colors carried by an original film and a diaphragm unaccompanied with color areas, so arranged that the pupil of emergence of said objective is in the anterior focal plane of the collimator lens, the latter being in the vicinity of the focal plane of said objective, the aberrations comprising spherical aberration, aigrettes, astigmatism and curvature of the field, introduced by the collimator lens being corrected by compensating aberrations introduced into said objective.

7. An optical combination comprising an objective adapted for copying films in cinematography with films having a goffered base containing a symmetrical lens system and a diaphragm, and a collimator lens, so arranged that the pupil of emergence of said objective is in the anterior focal plane of the collimator lens.

8. An optical combination comprising an objective adapted for copying films in cinematography with films having a goffered base containing an asymmetrical lens system having a collimating lens and constructed so as to reproduce on a copy film a separate registration of each of the monochrome registrations representing different colors carried by an original film and a diaphragm unaccompanied with color areas, so arranged that the pupil of emergence of said objective is in the anterior focal plane of the collimator lens.

9. A duplex objective adapted for making copies of goffered films adapted for use in cinematography, said objective comprising two symmetrically arranged optical systems, one member of each system forming the objective proper and another member being adapted to act as a collimating lens, and a diaphragm located substantially midway between said members forming the collimating lens.

10. An optical combination adapted for copying goffered films for use in cinematography comprising an objective, a diaphragm associated therewith, a collimator lens and a goffered film on which a copy is to be made located anterior thereof and a collimator lens and a goffered film to be copied located posterior thereof.

11. An apparatus for copying images of one goffered film onto another goffered film, comprising an optical combination for copying goffered films for use in cinematography comprising an objective, a diaphragm associated therewith, a collimator lens located anterior thereof and a collimator lens located posterior thereof, the objective and two collimator lenses being located between the film to be copied and the film on which which the copy is to be made.

ANDRÉ OSWALD.